US006761008B2

(12) United States Patent
Chen et al.

(10) Patent No.: US 6,761,008 B2
(45) Date of Patent: *Jul. 13, 2004

(54) CONNECTING SYSTEM FOR SURFACE COVERINGS

(75) Inventors: Hao A. Chen, Chadds Ford, PA (US); Richard Judd, Newark, DE (US)

(73) Assignee: Mannington Mills, Inc., Salem, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/919,755

(22) Filed: Aug. 1, 2001

(65) Prior Publication Data

US 2002/0031646 A1 Mar. 14, 2002

Related U.S. Application Data

(63) Continuation-in-part of application No. 09/736,955, filed on Dec. 14, 2000, now Pat. No. 6,675,545, which is a continuation-in-part of application No. 09/630,121, filed on Aug. 1, 2000, which is a continuation-in-part of application No. 09/460,928, filed on Dec. 14, 1999, now Pat. No. 6,617,009.

(51) Int. Cl.[7] .............................................. E04F 15/02
(52) U.S. Cl. .................... 52/586.1; 52/586.2; 52/309.1; 52/747.1; 403/298
(58) Field of Search .......................... 52/582.1, 586.1, 52/586.2, 585.1, 396.04, 309.1, 698, 704, 707, 747.1; 403/297, 298

(56) References Cited

U.S. PATENT DOCUMENTS

| 1,018,987 A | | 2/1912 | Philpot et al. | |
| 1,361,501 A | | 12/1920 | Schepmoes | |
| 1,723,306 A | * | 8/1929 | Sipe | 211/182 |
| 1,743,492 A | * | 1/1930 | Sipe | 29/451 |
| 1,946,646 A | * | 2/1934 | Storm | 52/393 |

(List continued on next page.)

FOREIGN PATENT DOCUMENTS

| DE | 2824656 A1 | * | 1/1979 | ................ 52/586.1 |
| DE | 3150352 A1 | | 10/1982 | |
| DE | 3135716 A1 | | 6/1983 | |
| DE | 33 43 601 A1 | | 12/1983 | |
| DE | 3932980 A1 | * | 11/1991 | ................ 52/586.1 |
| DE | 42 42 530 A1 | | 12/1992 | |

(List continued on next page.)

OTHER PUBLICATIONS

Composite Panel Report: Laminate Flooring, "Wood Digest" Sep. 1999, pp. 37.
Copy of Co–pending U.S. Application No. 09/460,928.
Copy of Co–pending U.S. Application No. 09/630,121.
Copy of Co–pending U.S. Application No. 09/736,955.
International Search Report for PCT/US00/42812 mailed Aug. 10, 2001.

Primary Examiner—Brian E. Glessner
(74) Attorney, Agent, or Firm—Kilyk & Bowersox, P.L.L.C.

(57) ABSTRACT

A spline, tongue, connector, or snap connector is described and useful for connecting a variety of surface covering products together. In one embodiment the spline is a polymeric material having an elongated shape and dimensions such that the spline has a sufficient width to fit into and extend outside of a groove in a side edge of a first plank and to fit into a respective groove in a side edge of a second plank. The spline may be concealed from view when the first plank and the second plank are connected together by the spline. A surface covering system for connecting two or more planks together is also described as well as methods to connect two or more planks together using the splines of the present invention. The system can include a spline having a length that differs from the length of one or more of the planks.

43 Claims, 9 Drawing Sheets

U.S. PATENT DOCUMENTS

| | | | |
|---|---|---|---|
| 1,946,690 A | | 2/1934 | Haines |
| 2,142,305 A | | 1/1939 | Davis |
| 2,204,675 A | | 6/1940 | Grunert |
| 2,355,834 A | * | 8/1944 | Webb .......................... 52/578 |
| 2,740,167 A | | 4/1956 | Rowley |
| 3,310,919 A | | 3/1967 | Bue et al. |
| 3,397,496 A | | 8/1968 | Sohns |
| 3,619,963 A | | 11/1971 | Omholt |
| 3,623,288 A | * | 11/1971 | Horowitz ..................... 52/264 |
| 3,657,852 A | | 4/1972 | Worthington et al. |
| 3,694,983 A | | 10/1972 | Couquet |
| 3,760,547 A | | 9/1973 | Brenneman |
| 3,946,529 A | | 3/1976 | Chevaux |
| 3,950,915 A | * | 4/1976 | Cole .......................... 52/586.2 |
| 4,023,596 A | | 5/1977 | Tate |
| 4,169,688 A | | 10/1979 | Toshio |
| 4,170,859 A | * | 10/1979 | Counihan ..................... 52/391 |
| 4,226,064 A | | 10/1980 | Kraayenhof |
| 4,426,820 A | | 1/1984 | Terbrack et al. |
| 4,526,418 A | | 7/1985 | Martin |
| 4,599,841 A | * | 7/1986 | Haid ....................... 52/396.04 |
| 4,724,187 A | | 2/1988 | Ungar et al. |
| 4,759,164 A | | 7/1988 | Abendroth et al. |
| 4,769,963 A | | 9/1988 | Meyerson |
| 4,788,088 A | | 11/1988 | Kohl |
| 4,947,595 A | | 8/1990 | Douds et al. |
| 4,976,221 A | | 12/1990 | Yetter |
| 5,007,222 A | * | 4/1991 | Raymond .................. 52/220.1 |
| 5,052,158 A | | 10/1991 | D'Luzansky |
| 5,076,034 A | * | 12/1991 | Bandy .................. 52/204.591 |
| 5,295,341 A | | 3/1994 | Kajiwara |
| 5,322,335 A | | 6/1994 | Niemi |
| 5,349,796 A | | 9/1994 | Meyerson |
| 5,367,844 A | | 11/1994 | Diedrich |
| 5,480,602 A | | 1/1996 | Nagaich |
| 5,503,788 A | | 4/1996 | Lazareck et al. |
| 5,553,427 A | | 9/1996 | Andres |
| 5,642,592 A | | 7/1997 | Andres |
| 5,647,184 A | | 7/1997 | Davis |
| 5,660,016 A | | 8/1997 | Erwin et al. |
| 5,694,730 A | | 12/1997 | Del Rincon et al. |
| 5,713,165 A | | 2/1998 | Erwin |
| 5,758,466 A | | 6/1998 | Tucker |
| 5,791,113 A | * | 8/1998 | Glowa et al. ................ 403/298 |
| 5,797,237 A | | 8/1998 | Finkell, Jr. |
| 5,833,386 A | | 11/1998 | Rosan et al. |
| D406,360 S | | 3/1999 | Finkell, Jr. |
| 6,006,486 A | | 12/1999 | Moriau et al. |
| 6,023,907 A | | 2/2000 | Pervan |
| 6,139,945 A | | 10/2000 | Krejchi et al. |
| 6,189,282 B1 | * | 2/2001 | VanderWerf ............... 52/582.1 |
| 6,260,326 B1 | * | 7/2001 | Muller-Hartburg ........... 52/601 |

FOREIGN PATENT DOCUMENTS

| | | | | |
|---|---|---|---|---|
| DE | 298 23 681 U1 | * | 12/1999 | ........... E04F/15/02 |
| FR | 2 557 905 | | 7/1985 | |
| GB | 484750 | * | 5/1938 | ............... 52/586.2 |
| GB | 1189485 | | 4/1970 | |
| GB | 1 430 423 | | 3/1976 | |
| GB | 02095814 A | | 10/1982 | |
| GB | 02147856 A | | 5/1985 | |
| JP | 3-169967 | | 7/1982 | |
| JP | 57-119056 | | 7/1982 | |
| JP | 405169534 A | | 7/1993 | |
| JP | 0147603 | * | 12/1998 | ........... E04F/15/02 |
| WO | WO 94/26999 | | 11/1994 | |
| WO | WO 95/11333 | | 4/1995 | |
| WO | WO 96/07801 A1 | | 3/1996 | |
| WO | WO 97/21011 | | 6/1997 | |

* cited by examiner

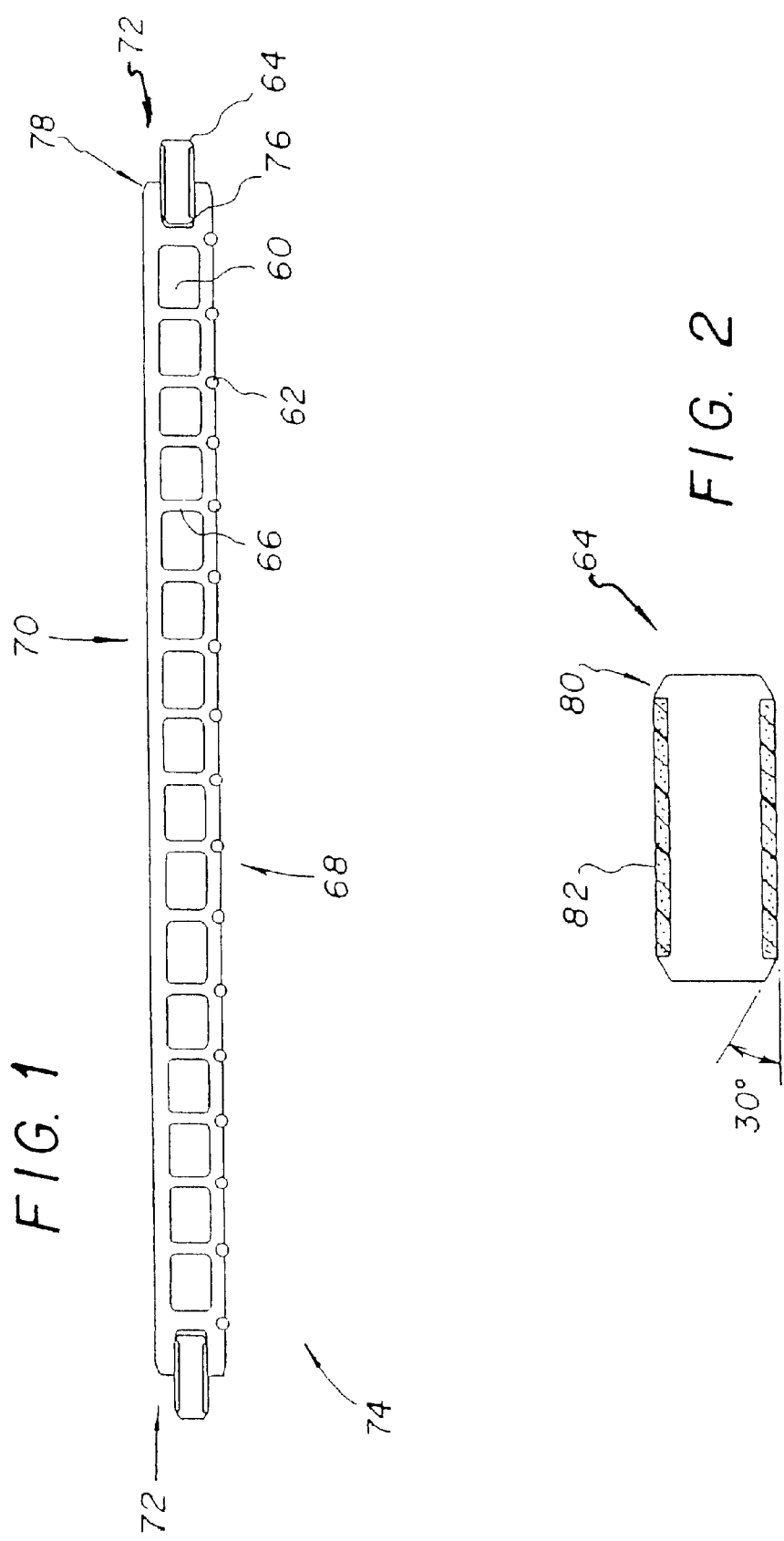

CONNECTING SYSTEM FOR SURFACE COVERINGS

This application is a continuation-in-part of prior U.S. patent application Ser. No. 09/736,955 filed Dec. 14, 2000, now U.S. Pat. No. 6,675,545, which is a continuation-in-part of prior U.S. patent application Ser. No. 09/630,121 filed Aug. 1, 2000, which is a continuation-in-part of U.S. patent application Ser. No. 09/460,928 filed Dec. 14, 1999, now U.S. Pat. No. 6,617,009, all three of which are incorporated herein in their entireties by reference.

BACKGROUND OF THE INVENTION

Commercially available laminate flooring (using high or medium density fiberboard or particle board as the core layer) has gained overwhelming success in the flooring market. The growth rate of the laminate flooring has remained in the double digits since the product was introduced in the United States market. The success of this product is credited to certain properties such as stain resistance, wear resistance, fire resistance, good cleanability, and the ability to use just about any type of printed design. In addition, the overall emission of organic compound vapor is low and the laminate flooring is considered color stable and environmentally friendly over other competing flooring products.

The biggest concern with commercially available laminate flooring is the moisture resistance of the finished product and the sensitivity of the raw materials (high or medium density fiberboard, paper, and particle board) to moisture during the manufacturing process. In some instances, the moisture can lead to some serious quality control issues and application restraints. For instance, and just to name a few, the higher moisture content in the product, such as in the particle board or fiberboard, can cause blistering and adhesion failure of the melamine surface to the core. Also, higher moisture contents can lead to dimensional instability of the finished product, which then results in the cupping or doming of the product, which is extremely undesirable, especially when installers are laying down the flooring. Also, excessive moisture contents can create edge peaking due to the swelling of the product and such edge peaking can result in edge chip-off or premature wear-out or can soil more quickly. The susceptibility to moisture content also leads to some installers not wishing to place such laminate flooring in areas which are subject to having water on the surface of the floor, such as in the kitchen and bathroom areas.

The suppliers of such laminate flooring have appreciated the problems associated with their products and have attempted to overcome these problems by developing laminate flooring having better moisture resistance by using melamine, phenolic, or isocyanate binders to partially replace urea resins present in the laminate flooring. While this improvement has made the product more moisture resistant, the current commercially available laminate floorings are still prone to moisture damage. For instance, the thickness of laminate flooring can swell by 10% and water absorbency can exceed more than 15% by weight according to the 24-hour water absorption test. Another attempted solution at reducing the moisture resistance weaknesses of current laminate flooring has led some manufactures to apply a water-repellant material on the upper edges of the tongue and groove areas which further serve to resist any moisture penetration through joints. Still another attempted solution involves applying silicone caulk to seal the edges and voids of the laminate perimeter where the laminate flooring meets the wall. However, if very stringent installation instructions are not followed, the laminate flooring will still be subjected to moisture damage.

Accordingly, there is a need to develop flooring systems which overcome the above weaknesses and disadvantages of current commercially available laminate flooring.

SUMMARY OF THE INVENTION

A feature of the present invention is to provide a spline, tongue, connector, snap connector, or other joining system element, herein referred to as a spline, which can be used in a surface covering system and which preferably provides improved moisture resistance and is not susceptible to damage caused by moisture.

Another feature of the present invention is to provide a spline for laminate planks and other surface coverings which is economically feasible and permits easy installation and flexibility.

Still another feature of the present invention is to provide a surface covering system which has significant improvements with respect to ease of installation and includes a fool-proof installation design and technique.

Another feature of the present invention is to provide a surface covering system which avoids the use of a wet adhesive application method.

Another feature of the present invention is to provide a flooring system that has great flexibility so as to make various shapes, sizes, and bevel edges.

Another feature of the present invention is to provide a flooring system that can alleviate the requirement of installing the plank in a given orientation.

Also, a feature of the present invention is to provide a surface covering system which has the ability to tolerate some imperfections in the sub-floor or substrate and thus avoid telegraphing the imperfections on the surface covering itself.

A further feature of the present invention is to provide a surface covering system which has improved damaged resistance properties, such as improved impact strength and the like, especially in the joint areas.

Additional features and advantages of the present invention will be set forth in the description which follows, and in part will be apparent from the description, or may be learned by practice of the present invention. The features and other advantages of the present invention will be realized and attained by means of the elements and combinations particularly pointed out in the written description and appended claims.

To achieve these and other advantages and in accordance with the purposes of the present invention, as embodied and broadly described herein, the present invention relates to a spline, tongue, connector, or snap connector for connecting two or more planks together. The spline is preferably made from a polymeric material and has a shape and dimensions such that the spline has a sufficient width to fit into and extend outside of a groove on a side edge of a first plank and also to fit into a respective groove on a side edge of a second plank. The spline may also be shaped such that when the first plank and the second plank are connected together by the spline, the spline is concealed from view.

The present invention further relates to a surface covering system for connecting two or more planks together. The surface covering system involves two or more planks and at least one spline. The planks each have a groove on at one side edge and the spline is a polymeric material having a shape and dimensions such that the spline has a sufficient width to fit into and extend outside of a groove on a side edge of a first plank and to fit into a respective groove on a side edge of a second plank. The spline may be concealed from view when the first plank and the second plank are connected together by the spline or may be wide enough to show when the first and second planks are connected together.

The present invention further relates to a plurality of planks connected together by one or more splines. Each plank has a groove on at least one side edge thereof and the spline is a polymeric material having a shape and dimensions such that the spline has a sufficient width to fit into and extend outside of a groove located on the side edge of a first plank and to fit into a respective groove located on a side edge of a second plank. The spline, as described above, may be concealed from view when the first plank and the second plank are connected together by one or more splines.

Finally, the present invention also relates to a method to connect two or more planks together and involves inserting one edge of a spline into a groove in one plank and inserting the opposite edge of the spline into a groove on a second plank. The spline is a polymeric material having a shape and dimensions such that the spline has a sufficient width to fit into and extend outside a groove located on a side edge of a first plank and to fit into a respective groove located on a side edge of a second plank. The spline may be concealed from view when the first plank and the second plank are connected together by the spline, or may show through between the planks.

Another advantage of the spine is the provision of a bridging or leveling effect between a plank and another plank adjoining it on the end. For this purpose and to increase effectiveness, the spline may be designed of a different length than the planks, for example, longer than the length of individual planks to be held together with the spline.

It is to be understood that both the foregoing general description and the following detailed description are exemplary and explanatory only and are intended to provide further explanation of the present invention, as claimed.

The accompanying drawings, which are incorporated in and constitute a part of this application, illustrate several embodiments of the present invention and together with the description serve to explain the principles of the present invention.

BRIEF DESCRIPTION OF THE DRAWINGS

FIG. 1 is a schematic diagram showing one embodiment of a spline of the present invention.

FIG. 2 is a schematic diagram showing a side view of a spline design of the present invention which can be used to connect planks together.

DETAILED DESCRIPTION OF THE PRESENT INVENTION

Figure 3:
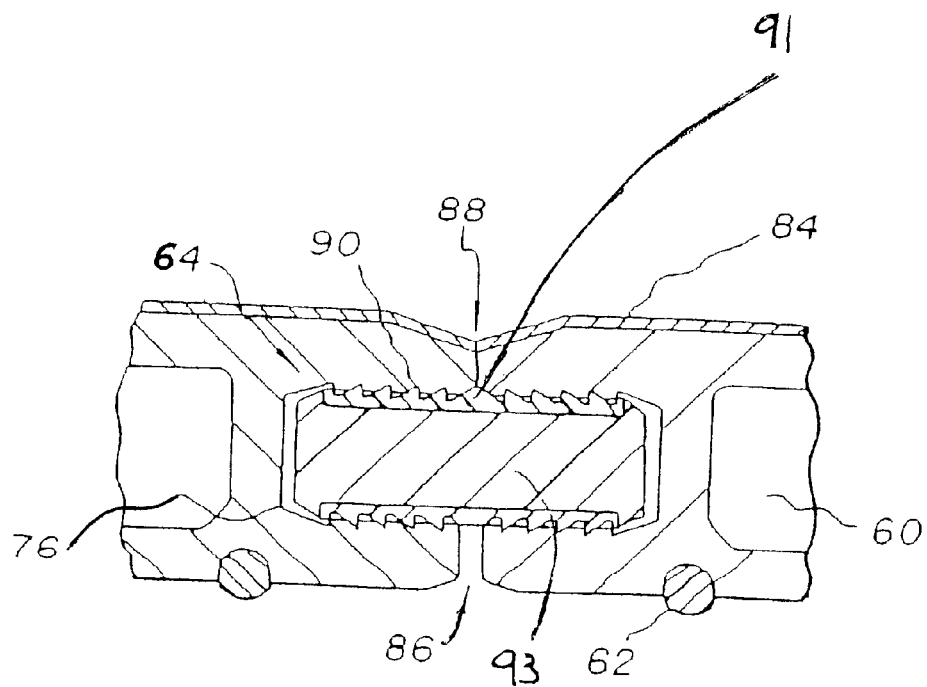
FIG. 3 is a schematic diagram of a sectional view showing another embodiment of a spline of the present invention.

In general, the present invention relates to a spline, tongue, connector, or snap connector for connecting two or more planks together to form a surface covering. Preferably, the surface covering is for flooring surfaces. The spline of the present invention and the surface covering system of the present invention can be used in a variety of applications including, but not limited to, wall panels, ceiling panels, decks, patios, furniture surfaces, shelving, and other surface coverings or parts thereof.

The spline of the present invention can be used to connect a variety of surface covering products. Any surface covering product having the ability to be formed or manufactured such that grooves can be created to receive the spline of the present invention can be used as part of this invention to form surface coverings. For instance, laminate floor products can be connected by the spline of the present invention. Other floor products that can be connected together by the spline of the present invention include, but are not limited to: plastic-containing products such as hard surface products where the groove can be formed by extrusion molding, injection molding, and the like; and cellulosic-type products wherein a groove can be machined into the part to receive the spline. Products of dissimilar materials can also be joined using the spline of the present invention.

Besides floor coverings, other surface covering products that can be connected together by the spline of the present invention include, but are not limited to, ceiling tiles, wall paneling, deck paneling, fascia, partition panels, horizontal surfaces, table tops, chest tops, and counter tops.

The surface covering products that are connected together by the spline of the present invention preferably have at least one side edge of the surface covering product having a groove to receive the spline of the present invention. A second surface covering product should also have at least one side that has a groove on the side edge to receive the other edge of the spline in order to connect two or more surface covering products together.

The spline of the present invention preferably is a polymeric material. The polymeric material that the spline is made from is preferably a thermoplastic material although other types of polymers can be used. Examples of polymeric materials that can be used to form the spline include, but are not limited to, polyvinyl chloride, polyvinyl chloride/rubber blends, acrylonitrilebutadiene styrene (ABS), polyethyleneterephthalate (PET), polybutyleneterephthalate (PBT), other polyesters, polyolefins, and the like. The spline can be formed by any technique, such as extrusion techniques. A die having the shape of the spline can be attached to an extruder such as one from American Maplan Corporation, e.g., Model TS-88, which has the ability to process rigid PVC profiles with a maximum output capacity of about 900 pounds/hour, based on a compound bulk density of 37 lb/ft$^3$. The TS-88 is a twin screw extruder which has a barrel heating section as well as a vacuum section. In this preferred extruder, there are 12 temperature zones with 6 for cooling and a temperature control system. Depending on the form of the resin, plastic compound, or particulate moldable material to be extruded, a twin screw or a single screw extruder may be used.

The spline of the present invention can also be formed by other molding techniques or other conventional technology used to form polymeric materials having desired shapes and forms.

The spline is shaped such that it can connect two or more planks together. In particular, the spline has a shape and dimensions such that the spline has a sufficient width to fit into and extend outside of a groove on a side edge of a first plank and to fit into a respective groove on the side edge of a second plank. The spline may be shaped such that the spline is concealed from view when the first and second planks are connected together by the spline, or it may have a wider width such that the spline can be seen when the planks are connected. The spline is preferably rectangular-shaped. The sides of the spline that fit into the grooves of the plank are preferably flanged, toothed, flat, or include a combination of such designs. These types of design on the edges of the spline serve to provide a snug or tight fit within the grooves of the planks, for example, the grooves exemplified in the drawings. Each plank preferably has a groove in two or more side edges of the plank.

According to an embodiment of the present invention, a system and method of forming the system are provided whereby the system includes two or more planks, each having a length, and a spline having a length that differs from the length of at least one of the planks. The spline can be longer than at least one at the planks and can be longer than each of the two or more planks.

According to an exemplary system of the present invention, a system is provided whereby the planks of the system have a flanged or toothed groove on at least one surface thereof. Preferably, the system includes a spline having teeth on at least one surface thereof, and a plank with a groove having teeth that engage the toothed surface of the spline.

The spline can optionally have tooth-shaped notches on the top and bottom surfaces that engage the top and bottom surfaces of the grooves in the plank in order to also create a snug and tight fit. The spline can have a combination of toothed, flanged, protruding, beaded, and/or flat portions on the top and/or bottom surfaces. Preferably, the spline has teeth on both a top surface and bottom surface thereof.

The width of the spline and thickness of the spline are based on the depth and height of the grooves in the planks for which the spline is used to connect two or more planks together. Depending on the product that the spline is connecting, the spline can be made to match the grooves for a snug and tight fit. For instance, the spline can have a thickness of from about 0.1 inch to about 0.2 inch and a width of from about 0.4 inch to about 0.6 inch in order to fit into a groove in the side of a plank having a depth of from about 0.2 inch to about 0.3 inch and a groove height of from about 0.1 inch to about 0.2 inch. More specifically, the spline can have a thickness of from about 0.153 inch to about 0.185 inch, for example, from about 0.175 inch to about 0.185, and a width of from about 0.478 inch to about 0.508 inch, for example, from about 0.478 inch to about 0.495 inch or from about 0.485 inch to about 0.495 inch, in order to fit into a groove in the side of a plank having a groove depth of from about 0.255 inch to about 0.280 inch and a groove height of from about 0.142 inch to about 0.152 inch.

As stated above, the spline preferably has a sufficient width such that the spline is able to adequately connect two or more planks together by inserting the spline into a groove of one plank and then into a groove of a second plank. When the two planks are connected together, the spline is preferably and entirely concealed from the visual surface of the surface covering. Tolerance considerations should be taken into account such that preferably the maximum contact between the groove and the top and bottom spline surfaces is maintained but preferably narrow enough to be less than the combined groove depth of adjacent planks grooves to be joined together so that the top surfaces of the planks will hide the spline. According to an alternative embodiment of the present invention, the combined depth of the adjacent planks is not sufficient to conceal the entire spline such that some of the spline can be seen when the planks are connected together.

In a preferred embodiment, the spline is preferably a co-extruded material and more preferably is a co-extruded material made from a rigid thermoplastic material in the central portion of the spline and a soft thermoplastic material at the top and bottom surfaces of the spline, wherein the softer material engages the grooves of two or more planks. The soft thermoplastic material is preferably flexible polyvinyl chloride or a blend of polyvinyl chloride and nitrile rubber. This soft thermoplastic material has the ability to be more flexible and thus create a tighter fit when engaging the grooves of the planks, and allows a higher tolerance to fit. In the case of appropriately soft teeth, a spline thickness of from about 3 mil to about 38 mil greater than the groove height can be tolerated. A rigid central portion of the spline is preferably provided and enables rigidity and strength needed in order for the spline to be handled and inserted into the grooves of the planks and to impart a bridging effect between the ends of abutted adjoining planks.

The spline can be any length such as from about 4 feet to about 9 feet, for example, from about 55 inches to about 75 inches, and more preferably from about 7 feet to about 8 feet long. Preferably, the length of the spline exceeds the length of the planks to be joined. For example, a plurality of splines, each having a length of about 7 feet, is preferably used to join a plurality of planks, each having a length of about 6 feet.

In addition, while not necessary, the spline can further have an adhesive or bonding agent applied to the surfaces that engage the grooves of the planks in order to create an even stronger connection between the planks and splines. Such adhesives that can be used include, but are not limited to, solvent welds which fuse the spline/plank interface by partially dissolving and swelling the spline and plank at their interface, epoxies, urethanes, and other cross-linking adhesives. Preferably, the adhesive or adhesive system provides a water-impervious bond, and preferable adhesives of this type include solvent welding or crosslinkable adhesives.

For purposes of the present invention, the term "plank" is used throughout and includes, but is not limited to, flooring planks, laminate flooring planks, floor tiles, laminate floor tiles, deck paneling, fascia, partition panels, horizontal surfaces, table tops, chest tops, and counter tops.

The remaining sides of the planks can also have grooves. For instance, the planks can have a groove on two or more sides of the edges of the plank, wherein the sides or edges are opposite to each other. The plank preferably has grooves on at least one side edge thereof and preferably on at least opposing sides. The remaining edges or sides of the plank can also have grooves or they may include tongues or can have no grooves or tongues whatsoever.

Though not necessary, the ends of the plank as well as the tongue and/or groove can have a bonding agent applied to these locations in order to seal or bond the planks together.

In the present invention, while each of the laminate planks can be affixed to the sub-floor or substrate, the laminate planks using the connecting system of the present invention can be attached only to each other through the groove and splines such that a floating floor system is provided. This promotes fast and easy laying of the floor system.

With the use of the connecting system of the present invention, the present invention achieves many benefits and advantages, such as moisture resistance.

Also, in the preferred embodiment of the present invention, the installation method used as a result of the splines of the present invention, preferably eliminates the glue needed for tongue and groove connections.

A full-spread adhesive can be applied between the underside of the planks and the sub-floor surface. This provides the advantages of added dimensional stabilization and sound deadening. Both of these properties would be beneficial in commercial applications.

In addition, the excellent moisture resistance of this surface covering system can eliminate the need for underpadding, though the use of underpadding is an option.

With reference to FIG. 1, FIG. 1 represents a schematic diagram of an end view of one embodiment of the plank with a spline. FIG. 1, is a perspective view looking at the front edge of the plank wherein the groove 76 would run along each longitudinal edge 72 of the plank. The spline 64 is inserted along the length of each groove 76. The plank edge 72 has the groove 76. Also labeled are the plank bottom surface 68 and top surface 70.

Referring to FIG. 2, FIG. 2 is a representation of a type of spline 64 that can be used in an embodiment of the present invention. As can be seen in FIG. 2, a preferably soft material 82 such as flexible PVC is located on the top and bottom surface of the spline in order to ensure a tight fit with the groove of the plank. Preferably, the plank is a thermoplastic plank. The spline design preferably has a thickness that is from about 3 mils to about 5 mils thicker than the groove of the plank in this embodiment. Depending upon the design of the spline, the ease of insertion into the groove can vary. For example, teeth or barbs can be formed on the top and/or bottom surfaces of the spline core. These teeth or barbs can be aimed is such a direction that insertion can be very easy, yet the spline is very difficult to remove from the groove of the plank. For example, the teeth can point in a direction substantially opposite to the direction of insertion of the spline into the groove. An exemplary angle for the teeth is from about 95° to about 170°, for example, about 135°, with respect to the direction of insertion. This relationship between the teeth and groove provides a strong plank-to-plank connection. If the spline is too thick, it can open the groove and cause edge peaking, and can be difficult to install. If the spline is too thin, it does not effectively engage with the teeth in the groove and can result in a weak connection. The edges of the spline or tongue 64 are tapered or beveled as shown at 80 in order to ensure that the tongue can readily be inserted into the groove.

In the embodiment shown in FIG. 2, the overall width of the spline or tongue 64 (from left to right) is 0.500 inch and the overall height is 0.155 inch. Of the 0.500 inch width, about 86% of that width is covered by the soft polyvinyl chloride material 82. Preferably, about 80% or more, for example, from about 80% to about 90% of the width, is covered by soft material 82. For a spline having a length of seven feet, for example, each of the top and bottom surfaces of the spline is covered by about 36 square inches of soft polyvinyl chloride material 82. The thickness of the soft material 82 shown on the top and bottom of the spline or tongue is 0.023 inch. The angled corners of the spline or tongue 64 are each angled about 30° with respect of the flat top and bottom respective adjacent surface of the spline or tongue 64.

FIG. 3 makes reference to a spline 64 which has teeth 90 on its surfaces which engage the grooves 76 of the planks. Further, as can be seen in FIG. 3, in a preferred embodiment, the top surfaces of the plank can form a V shape valley 88 and the top edges of the adjacent planks touch each other whereas the bottom edge portions of each respective plank are cut in order to have a slightly shorter length and thus form a gap 86 which ensures that the top ends 88 touch each other and do not leave any gaps on the walking surface of the planks. Reference numeral 84 shows a plank top layer, such as a print layer, a composite print layer, or the like.

In the embodiment shown in FIG. 3, the width dimension of the gap 86 (from left to right) is 0.030 inch. The thickness of the top layer 84 shown in FIG. 3 is 0.015 inch. The two connected planks shown in FIG. 3, each have dimensions of about 7.0 inches in width and about 72 inches in length, and each can be provided with 13 feet or strips 62. A protruding bead 91 is provided along the midline of the top surface of the spline 93 and rests between the adjacent side edges of the joined planks.

Figure 4:
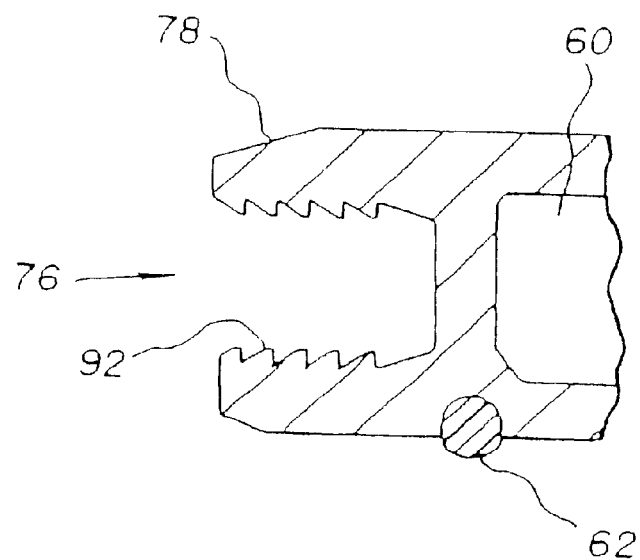
FIG. 4 is a schematic diagram illustrating a groove design on a side of a plank according to an embodiment of the present invention showing the groove that locks with a spline of the present invention.

Referring to FIG. 4, FIG. 4 is a depiction of a groove 76 which has receiving teeth 92 for a spline or tongue of the design shown at 90 in FIG. 3. In the embodiment shown in FIG. 4, the foot 62 has a width of 0.075 inch, a height of 0.075 inch, and is housed in a corresponding groove or hole that extends 0.050 inch into the bottom surface of the flooring plank. The beveled or tapered edge 78 shown in FIG. 4 is angled in an amount of 17° relative to the flat top surface of the plank. The beveled or tapered bottom edge opposite edge 78 is angled in an amount of 30° relative to the flat bottom surface of the plank. The receiving teeth 92 are each 0.040 inch wide (from left to right) and each has a flat top surface at its point that has a width of 0.008 inch. The gap between opposing top and bottom teeth is 0.150 inch. The depth of the groove 76, from the edge of the plank to the deepest part of groove 76 (from left to right) is 0.270 inch and the depth from the left edge of the plank to and including the last tooth within the groove is 0.201 inch. The beveled or tapered edge 78 intersects with the flat top surface of the plank 0.125 inch from the edge of the plank.

Figure 5:
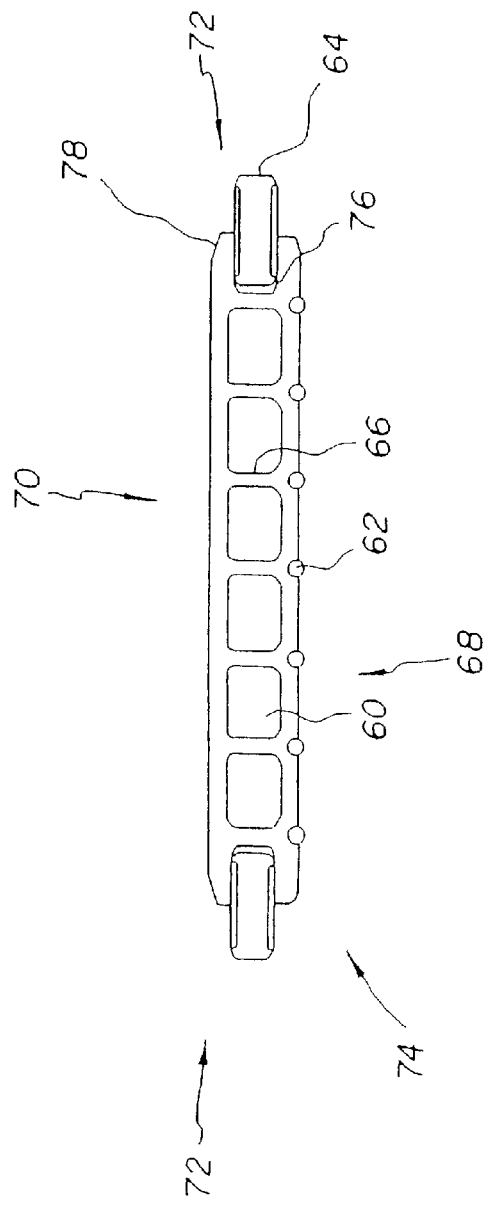
FIGS. 5 and 6 are schematic diagrams showing additional embodiments of splines of the present invention.
Figure 6:
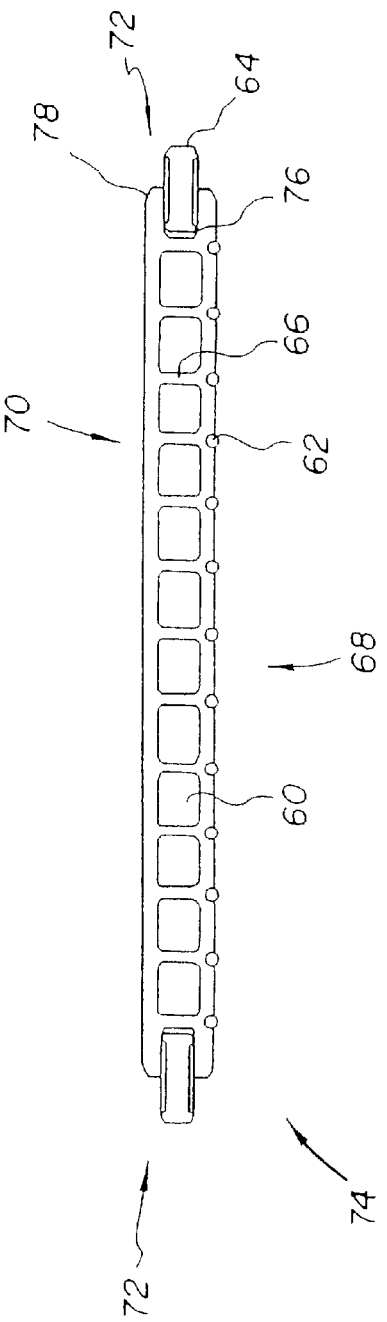

FIGS. 5 and 6 represent various different widths of the plank but generally show the same features as shown in FIG. 1 and the reference numerals in FIGS. 5 and 6 represent the same features as the corresponding numerals represented in FIG. 1.

The embodiment shown in FIG. 5 are substantially identical to the dimensions shown in FIG. 1 with the exception that the overall width of the plank shown in FIG. 5 is 3.000 inches as opposed to 5.000 inches for the width of the plank shown in FIG. 1. In addition, the two vertical side walls adjacent each respective gap 76, herein referred to as the two outermost side walls, are 0.075 inch in width as opposed to 0.080 inch in width for the corresponding outermost side walls of the embodiment shown in FIG. 1. The overall height of the plank shown in FIG. 5, from the flat top surface to the flat bottom surface (excluding the feet or strips 62 is 0.355 inch for the embodiment shown in FIG. 5, and from about 0.370 inch to about 0.375 inch including laminate adhesive.

For the embodiment shown in FIG. 6, the dimensions are substantially identical to those dimensions shown in the embodiment of FIG. 5, with the exception that the plank shown in FIG. 6 has an overall width of 5.000 inches.

Figure 7:
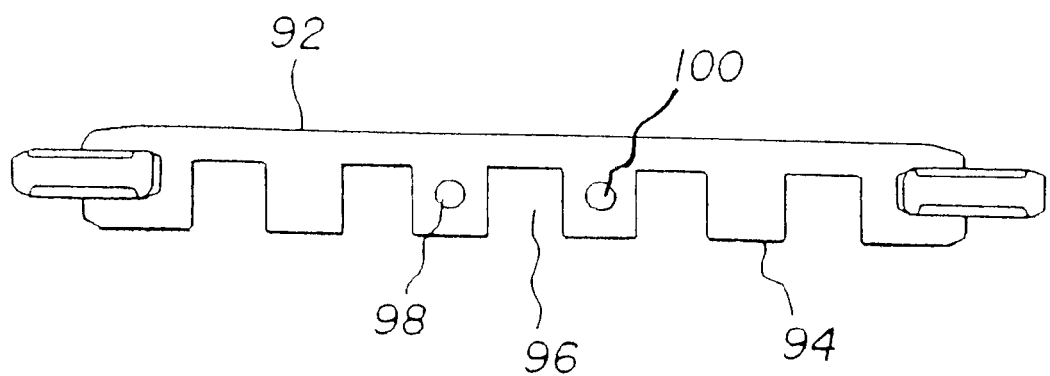
FIG. 7 is an end view of a plank having a spline in each of opposing edge grooves of the plank.

FIG. 7 shows yet another embodiment of a plank and spline system of the present invention. The plank includes U-shaped or ⌐-shaped recesses in the bottom surface 94 thereof. The top surface 92 of the plank is flat. A pin 98 and a hole 100 are provided at each end of the plank for aligning the hole and pin of one plank with a respective pin and hole of an adjacent plank.

Figure 8:
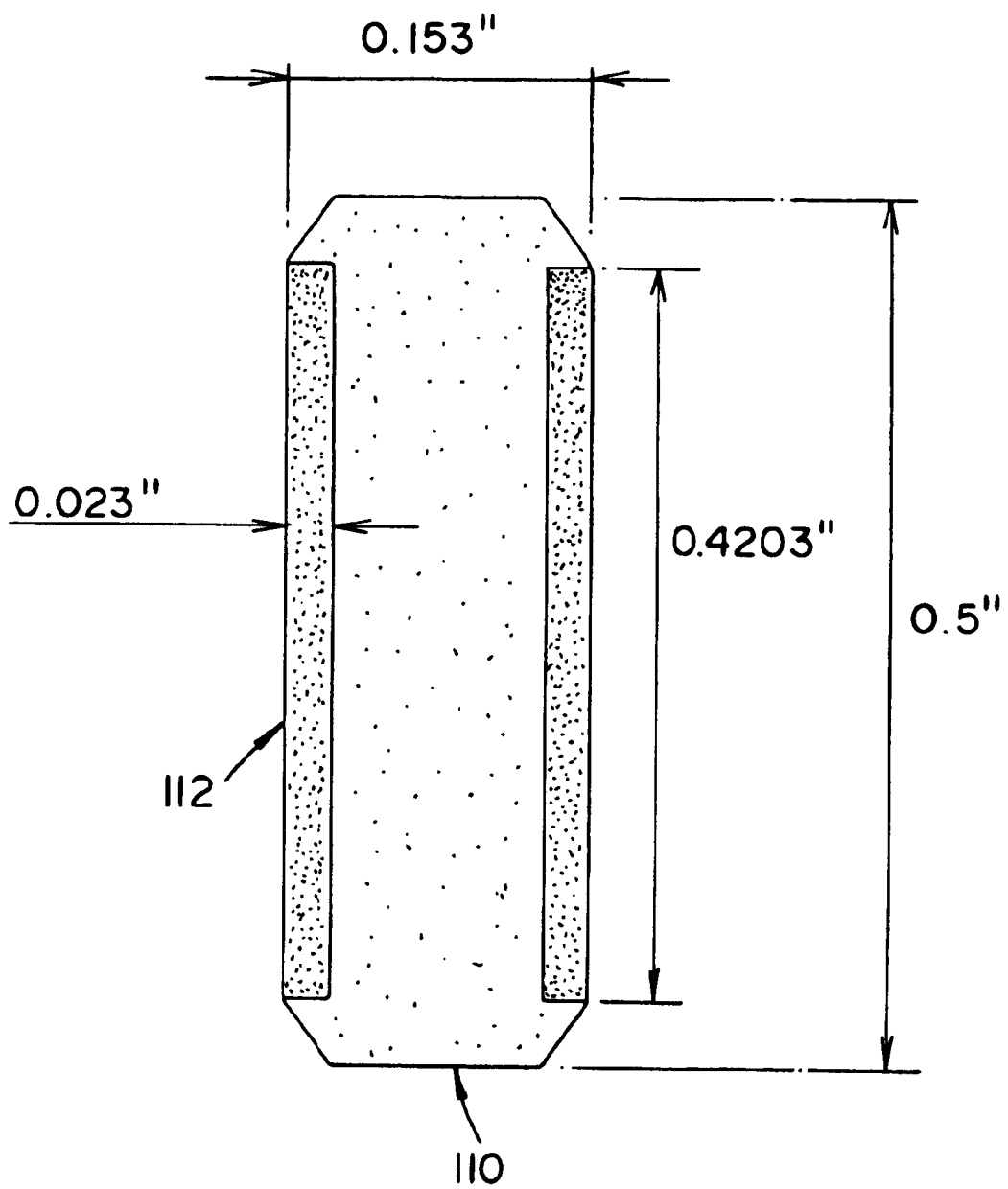
FIG. 8 is an end view of a substantially rectangular-shaped spline according to an embodiment of the present invention showing various dimensions of the spline in inches (")

FIG. 8 is an end view of a substantially rectangular-shaped spline according to an embodiment of the present invention showing various dimensions of the spline in inches ("). A core 110 is at least partially covered with a softer, more flexible, more resilient and/or more elastic surface material 112. The material useful for forming the core 110 can be a resinous material such as hard homopolymeric polyvinylchloride (PVC) material. An exemplary homopolymeric PVC material for the core material is GEON 8700 or 8700A available from BF Goodrich of Cleveland, Ohio, which has a density of 1.38 g/cc per ASTM D-792, and a hardness durometer of D=78 as per ASTM D-2240. An exemplary softer material for the surface material is an extrudable vinyl elastomer, for example, NORAPLAS 8602 available from North American Plastics, Inc. of Aberdeen, Miss., which has a density of 1.23 g/cc per ASTM D-792 and a hardness durometer of about Shore A=59 as per ASTM D-2240.

Figure 9:
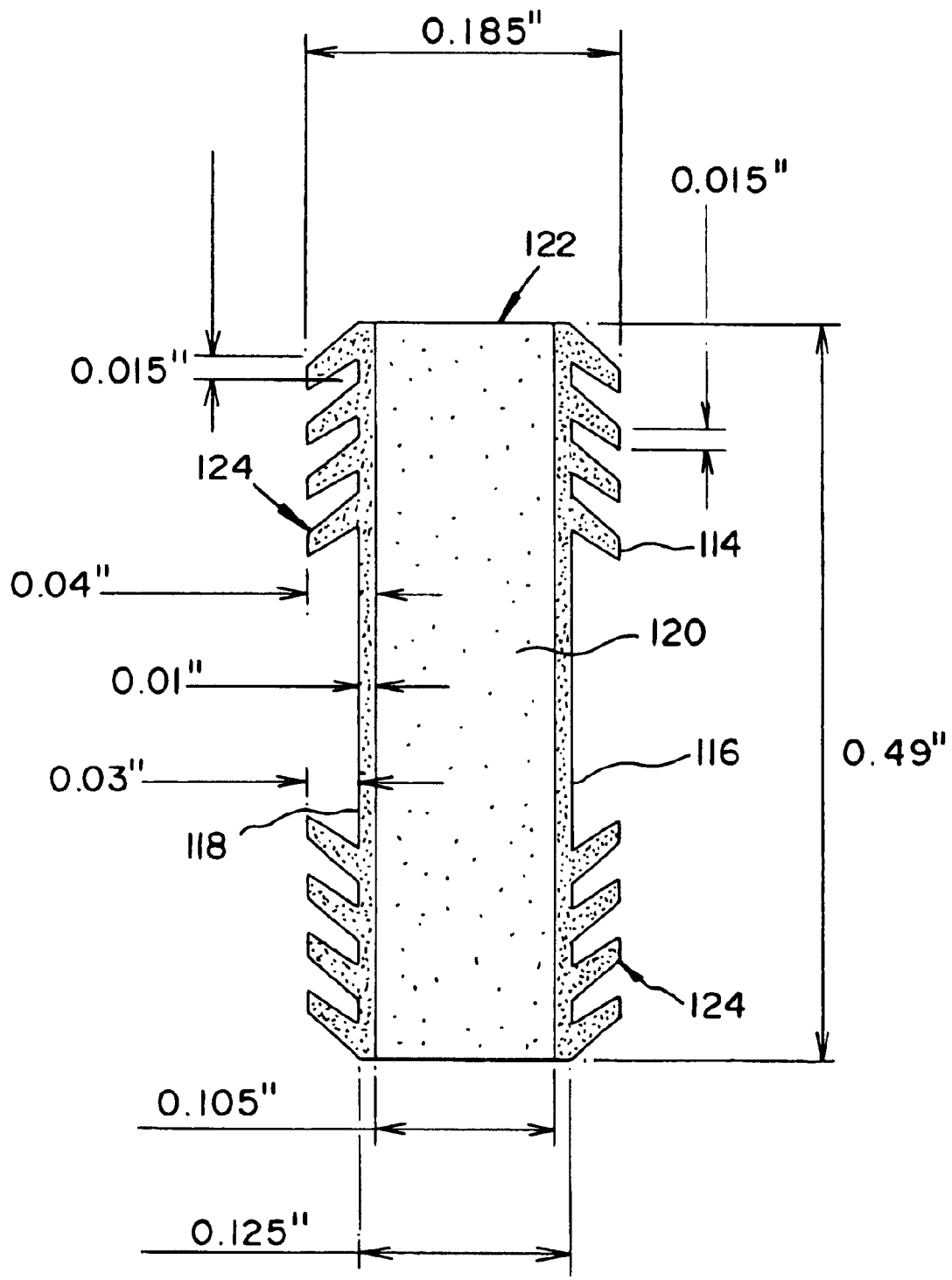
FIG. 9 is an end view of a substantially rectangular-shaped spline according to another embodiment of the present invention showing various dimensions of the spline in inches (") and showing angled teeth on the top (right-side) and bottom (left-side) surfaces of the spline.

FIG. 9 is an end view of a substantially rectangular-shaped spline 122 according to another embodiment of the present invention showing various dimensions of the spline 122 in inches (") and showing angled teeth on the top (right-side) and bottom (left-side) surfaces (116, 118) of the spline. A core 120 is at least partially covered with a softer, more flexible, more resilient and/or more elastic surface material 124. The surface material includes teeth 114 on both the top surface 116 and on the bottom surface 118 of the spline 122. The material useful for forming the core 120 can be a resinous material such as hard homopolymeric polyvinylchloride (PVC) material. An exemplary homopolymeric PVC material for the core material is GEON 8700 or 8700A. An exemplary softer material for the surface material is an extrudable vinyl elastomer, for example, NORAPLAS 8602.

Figure 10:
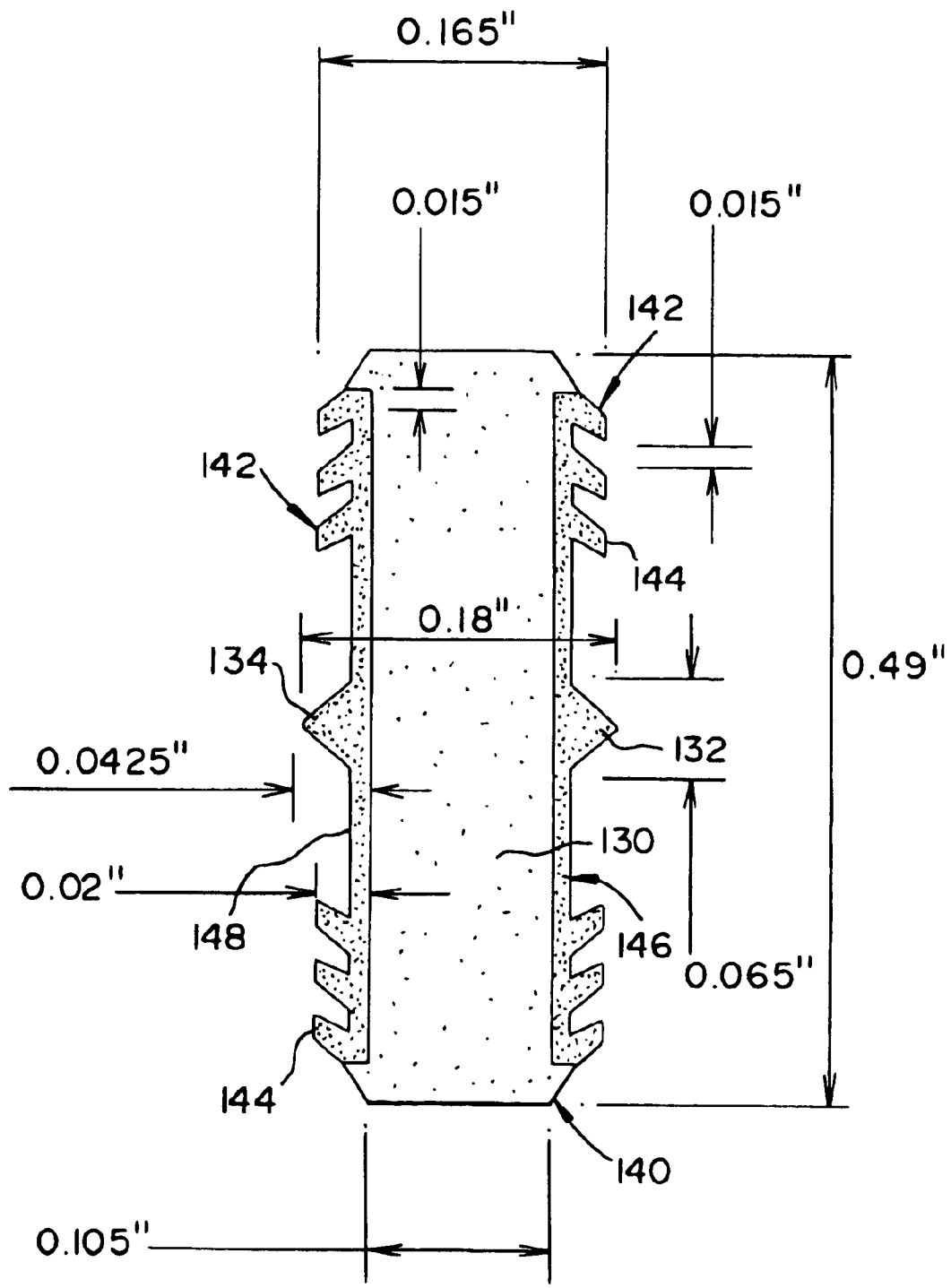
FIG. 10 is an end view of a substantially rectangular-shaped spline according to another embodiment of the present invention showing various dimensions of the spline in inches (") and protruding beads that extend in the direction of elongation of the spline on both the top and bottom surfaces of the spline.

FIG. 10 is an end view of a substantially rectangular-shaped spline 130 according to another embodiment of the present invention showing various dimensions of the spline 130 in inches (") and raised relief elements or protruding beads 132, 134 that extend in the direction of elongation of the spline 130 on the respective top surface 146 and bottom surface 148 of the spline. A core 140 is at least partially covered with a softer, more flexible, more resilient and/or more elastic surface material 142. The surface material includes teeth 144 on both the top surface 146 and on the bottom surface 148 of the spline 130. The material useful for forming the core 140 can be a resinous material such as hard homopolymeric polyvinylchloride (PVC) material. An exemplary homopolymeric PVC material for the core material is GEON 8700 or 8700A. An exemplary softer material for the surface material 142 is an extrudable semi-rigid vinyl, for example, NORAPLAS 8571 available from North American Plastics, Inc. of Aberdeen, Miss., which has a density of 1.35 g/cc per ASTM D-792 and a hardness durometer of about Shore D=57 as per ASTM D-2240.

Figure 11:
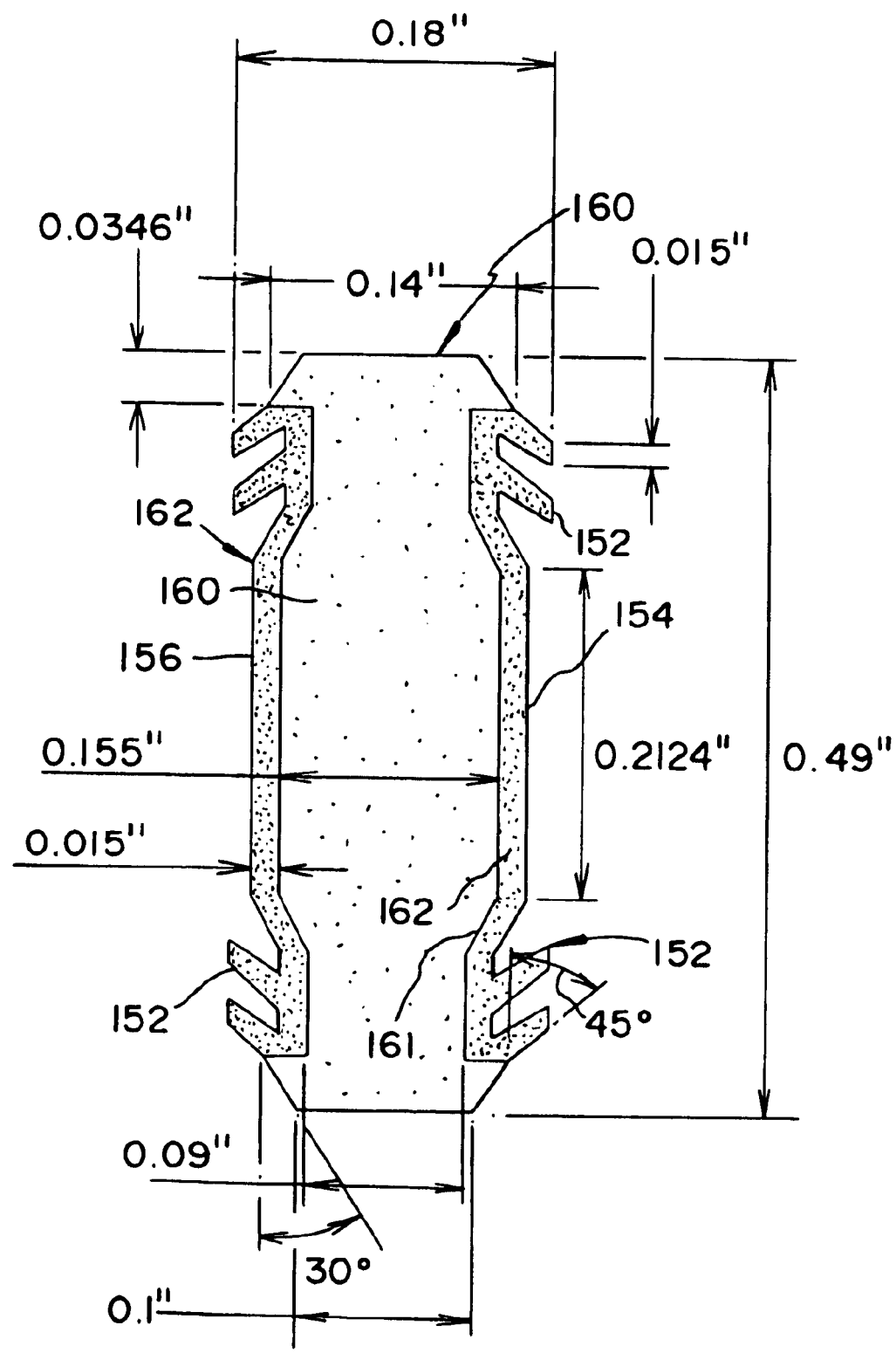
FIG. 11 is an end view of a substantially rectangular-shaped spline according to another embodiment of the present invention showing various dimensions of the spline in inches (") and showing a recessed portion of the core which accommodates toothed-protrusions.

FIG. 11 is an end view of a substantially rectangular-shaped spline 150 according to another embodiment of the present invention showing various dimensions of the spline 150 in inches (") and showing a recessed portion 161 of the core 160 that accommodates toothed-protrusions. The spline is provided with angled teeth on the top surface 154 (right-side) and bottom surface 156 (left-side) of the spline. A core 160 is at least partially covered with a softer, more flexible, more resilient and/or more elastic surface material 162. The material useful for forming the core 160 can be a resinous material such as hard homopolymeric polyvinylchloride (PVC) material. An exemplary homopolymeric PVC material for the core material is GEON 8700 or 8700A. An exemplary softer material for the surface material 162 is an extrudable vinyl elastomer, for example, NORAPLAS 8602.

Figure 12:
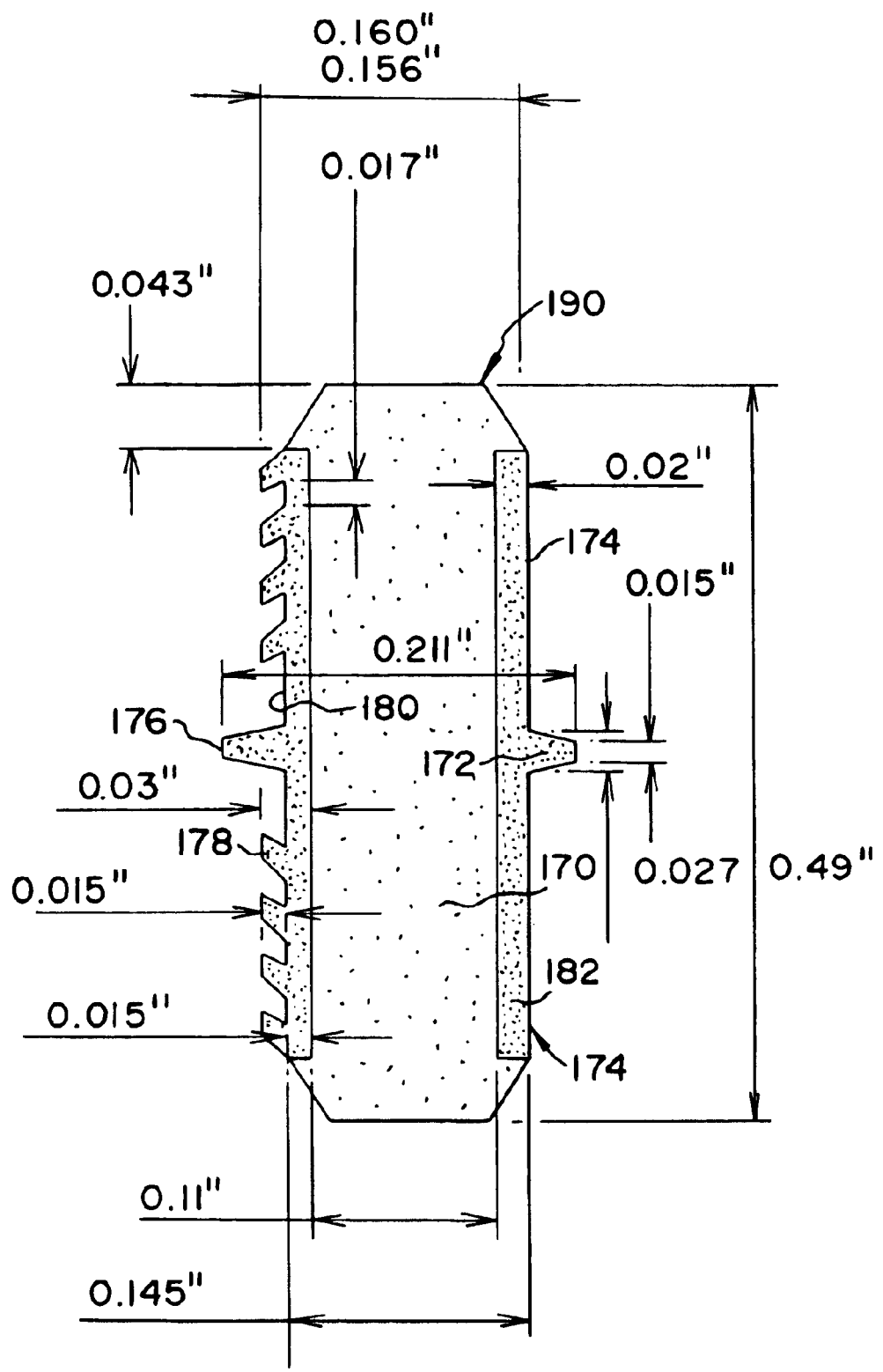
FIG. 12 is an end view of a substantially rectangular-shaped spline according to yet another embodiment of the present invention showing various dimensions of the spline in inches (") and showing a protruding bead on an otherwise flat top surface of the spline and a protruding bead along with teeth on the bottom surface of the spline.

FIG. 12 is an end view of a substantially rectangular-shaped spline 170 according to yet another embodiment of the present invention showing various dimensions of the spline 170 in inches (") and showing a protruding bead 172 on an otherwise flat top surface 174 of the spline 170. Also shown are a protruding bead 176 along with teeth 178 on the bottom surface 180 of the spline 170. The protruding beads run along the midlines of the respective top and bottom surfaces. The material useful for forming the core 190 can be a resinous material such as hard homopolymeric polyvinylchloride (PVC) material. An exemplary homopolymeric PVC material for the core material is GEON 8700 or 8700A. An exemplary softer material for the surface material 182 is an extrudable vinyl elastomer, for example, NORAPLAS 8571.

The surface covering system of the present invention can be used in a variety of applications including, but not limited to, wall panels, ceiling panels, flooring surfaces, decks, patios, furniture surfaces, shelving, deck paneling, fascia, partition panels, horizontal surfaces, table tops, chest tops, and counter tops, and other surface coverings or parts thereof.

Other embodiments of the present invention will be apparent to those skilled in the art from consideration of the specification and practice of the present invention disclosed herein. It is intended that the specification and examples be considered as exemplary only, with the true scope and spirit of the present invention being indicated by the following claims.

What is claimed is:

1. A spline for connecting two or more surface covering thermoplastic planks together, said spline comprising a polymeric material having an elongated shape and a width and height that are perpendicular to a direction of elongation of the spline, wherein said width is sufficient to fit into and extend outside of a groove in a side edge of a first plank and fit into a respective groove in a side edge of a second plank, said polymeric material comprising a rigid thermoplastic material in a central portion of the spline and a soft thermoplastic material at the top and bottom surfaces of the spline, wherein each of said top and bottom surfaces has a surface area and about 80% or more of the surface area of at least one of the top and bottom surfaces is covered with said soft thermoplastic material, and wherein at least one surface of said spline includes a bonding agent.

2. The spline of claim 1, wherein at least one of said thermoplastic materials comprises a polyvinyl chloride material.

3. The spline of claim 1, wherein said spline is rectangular-shaped and each side edge that fits into a groove of a plank is beveled.

4. The spline of claim 1, wherein said spline has tooth-shaped notches on both said top and bottom surfaces, wherein said notches fit into grooves of a first plank and an adjacent second plank.

5. The spline of claim 1, wherein said spline has tooth-shaped notches on one of said top and bottom surfaces and the other of said top and bottom surfaces is flat.

6. The spline of claim 1, wherein said spline comprises a co-extruded polymeric material.

7. A surface covering system for connecting two or more thermoplastic planks together, said system comprising two or more thermoplastic planks including a first plank and a second plank, and at least one spline that is elongated in a direction of elongation, wherein each plank has a groove on at least one side thereof having at least one receiving tooth, and said spline comprises a polymeric material having a shape such that said spline has a sufficient width to fit into and extend outside of a groove in the side edge of the first plank and to fit into a respective groove in a side edge of the second plank, wherein said first and second planks each have a length and said spline has a length that differs from the length of at least one of said first and second planks, and wherein said first plank, second plank, spline, groove, or any combination thereof includes a bonding agent.

8. The surface covering system of claim 7, wherein said spline is concealed from view when said first plank and said second plank are connected together by said spline.

9. The surface covering system of claim 7, wherein said surface covering is a floor or floor covering.

10. The surface covering system of claim 7, wherein said surface covering is a laminate floor.

11. The surface covering system of claim 7, wherein said at least one spline has a top surface, a bottom surface, and tooth-shaped notches on both said top and bottom surfaces, wherein said notches fit into the respective grooves of the first plank and the second plank.

12. The surface covering system of claim 7, wherein said at least one spline has a top surface, a bottom surface, and tooth-shaped notches on one of said top and bottom surfaces, wherein the other of said top and bottom surfaces is flat.

13. The surface covering system of claim 7, wherein each said groove in the at least one side of each of the first and second planks has teeth that engage at least one of said top and bottom surfaces of said spline.

14. The surface covering system of claim 7, wherein the length of said spline is longer than the length of at least one of said first and second planks.

15. The surface covering system of claim 7, wherein the length of said spline is longer than the length of each of said first and second planks.

16. A method to connect two or more thermoplastic planks together, each of said two or more thermoplastic planks having a length, said method comprising inserting one edge of an elongated spline having a length into a groove in a side edge of a first plank and inserting an opposite edge of the spline into a groove in a side edge of a second plank, said spline comprising a polymeric material having a shape and dimensions such that said spline has a sufficient width to fit into and extend outside of the groove in the side edge of the first plank and to fit into the groove in the side edge of the second plank, wherein the length of said spline differs from the length of at least one of said planks, wherein the groove of the first plank and the groove of the second plank include at least one receiving tooth, and wherein said first plank, second plank, spline, groove, or any combination thereof includes a bonding agent.

17. The method of claim 16, wherein said spline is concealed from view when said first plank and said second plank are connected together with said spline.

18. The method of claim 16 wherein said spline has a top surface, a bottom surface, and tooth-shaped notches on both said top and bottom surfaces, wherein said notches fit into the grooves of the first plank and the second plank.

19. The method of claim 16, wherein the length of said spline is longer than the length of at least one of said planks.

20. The method of claim 16, wherein the length of said spline is longer than the length of each of said first plank and said second plank.

21. A surface covering system for connecting two or more thermoplastic planks together, said system comprising two or more thermoplastic planks including a first plank and a second plank, and at least one spline that is elongated in a direction of elongation, wherein each plank has a groove on at least one side thereof, wherein said groove includes at least one receiving tooth, and said spline comprises a polymeric material having a shape such that said spline has a sufficient width to fit into and extend outside of a groove in the side edge of the first plank and to fit into a respective groove in a side edge of the second plank, wherein said first plank, second plank, spline, groove, or any combinations thereof includes a bonding agent.

22. The surface covering system of claim 21, wherein said spline is concealed from view when said first plank and said second plank are connected together by said spline.

23. The surface covering system of claim 21, wherein said surface covering is a floor or floor covering.

24. The surface covering system of claim 21, wherein said surface covering is a laminate floor.

25. The surface covering system of claim 21, wherein said at least one spline has a top surface, a bottom surface, and tooth-shaped notches on both said top and bottom surfaces, wherein said notches fit into the respective grooves of the first plank and the second plank.

26. The surface covering system of claim 21, wherein said at least one spline has a top surface, a bottom surface, and tooth-shaped notches on one of said top and bottom surfaces, wherein the other of said top and bottom surfaces is flat.

27. The surface covering system of claim 21, wherein said at least one spline has a top surface, a bottom surface, and tooth-shaped notches on one of said top and bottom surfaces, and wherein the other of said top and bottom surfaces is flat except for the presence of a raised relief element along a midline of the flat surface, wherein the midline extends along the spline in the direction of elongation of the spline.

28. The surface covering system of claim 21, wherein said at least one receiving tooth engages at least one of said top and bottom surfaces of said spline.

29. The surface covering system of claim 28, wherein said spline has at least one flat surface that engages the teeth in each of said grooves.

30. A plurality of thermoplastic planks connected together by one or more splines, wherein each plank has a groove on at least one side thereof, a) wherein said groove includes at least one receiving tooth or b) wherein said spline includes a top surface and a bottom surface, each having a soft thermoplastic material, and edge surfaces having a hard thermoplastic, or both a) and b), wherein each said spline is elongated in a direction of elongation and comprises a polymeric material having a shape such that said spline has a sufficient width to fit into and extend outside of a groove in a side edge of a first plank and to fit into a respective groove in a side edge of a second plank, and wherein said first plank, second plank, splines, grooves, or any combinations thereof includes a bonding agent.

31. The plurality of thermoplastic planks of claim 30, wherein said one or more splines is concealed from view when the plurality of planks are connected together with said one or more splines.

32. The plurality of thermoplastic planks of claim 30, wherein said one or more splines each has a top surface, a bottom surface, and tooth-shaped notches on both said top and bottom surfaces, wherein said notches fit into the grooves of the plurality of planks.

33. The plurality of thermoplastic planks of claim 30, wherein said one or more splines each has a top surface, a bottom surface, and tooth-shaped notches on one of said top and bottom surfaces, wherein the other of said top and bottom surfaces is flat.

34. The plurality of thermoplastic planks of claim 30, wherein said one or more splines each has a top surface, a bottom surface, and tooth-shaped notches on one of said top and bottom surfaces, and wherein the other of said top and bottom surfaces is flat except for the presence of a raised relief element along a midline of the flat surface, said midline elongated in the direction of elongation of said spline.

35. The plurality of thermoplastic planks of claim 30, wherein each said groove in the at least one side edge of each of the first and second planks has teeth that engage at least one of said top and bottom surfaces of said one or more splines.

36. The plurality of thermoplastic planks of claim 35, wherein said one or more splines has at least one flat surface that engages the teeth in each of said grooves.

37. A method to connect two or more thermoplastic planks together comprising inserting one edge of an elongated spline into a groove in a side edge of one plank and inserting the opposite edge of the spline into a groove in a side edge of a second plank, said spline comprising a polymeric material having a shape and dimensions such that said spline has a sufficient width to fit into and extend outside of the groove in the side edge of the first plank and to fit into the groove in the side edge of the second plank, and a) wherein said groove of said first plank and said groove of said second plank include at least one receiving tooth, or b) wherein said spline includes a top surface and a bottom surface having a soft thermoplastic material and edge surfaces having a hard thermoplastic material, or both, a) and b), and wherein said first plank, second plank, groove, spline, or any combinations thereof includes a bonding agent.

38. The method of claim 37, wherein said spline is concealed from view when said first plank and said second plank are connected together with said spline.

39. The method of claim 38, wherein said spline has a top surface, a bottom surface, and tooth-shaped notches on both said top and bottom surfaces, wherein said notches fit into the grooves of the first plank and the second plank.

40. The method of claim 38, wherein said spline has a top surface, a bottom surface, and tooth-shaped notches on one of said top and bottom surfaces, wherein the other of said top and bottom surfaces is flat.

41. The method of claim 38, wherein said spline has a top surface, a bottom surface, and tooth-shaped notches on one of said top and bottom surfaces, and wherein the other of said top and bottom surfaces is flat except for the presence of a raised relief element along a midline of the flat surface, said midline extending along the spline in the direction of elongation of the spline.

42. The method of claim 38, wherein said at least one tooth engages at least one of said top and bottom surfaces of said spline.

43. The method of claim 42, wherein said spline has at least one flat surface that engages the teeth in each of said grooves.

* * * * *